(12) United States Patent
Hu et al.

(10) Patent No.: US 7,111,203 B2
(45) Date of Patent: Sep. 19, 2006

(54) METHOD FOR IMPLEMENTING DATA BACKUP AND RECOVERY IN COMPUTER HARD DISK

(75) Inventors: Jianfeng Hu, Beijing (CN); Gang Bai, Beijing (CN); Peng Zhang, Beijing (CN); Wenbing Yang, Beijing (CN)

(73) Assignee: Legend (Beijing) Limited, Beijing (CN)

( * ) Notice: Subject to any disclaimer, the term of this patent is extended or adjusted under 35 U.S.C. 154(b) by 545 days.

(21) Appl. No.: 10/392,547

(22) Filed: Mar. 20, 2003

(65) Prior Publication Data

US 2004/0078680 A1    Apr. 22, 2004

(30) Foreign Application Priority Data

Mar. 20, 2002  (CN)  ................ 02 1 04483

(51) Int. Cl.
  *G06F 11/00*  (2006.01)
(52) U.S. Cl. ................. 714/36; 713/1; 713/2
(58) Field of Classification Search .......... 714/36; 713/1, 2
  See application file for complete search history.

(56) References Cited

U.S. PATENT DOCUMENTS 6,845,464 B1 * 1/2005 Gold ............................. 714/6
2002/0188837 A1 * 12/2002 Dayan et al. .................. 713/2
2005/0081004 A1 * 4/2005 Zhang ........................ 711/162

OTHER PUBLICATIONS

Microsoft, Microsoft Windows 2000 Professional Resouce Kit, 2000, p. 1401.*

* cited by examiner

Primary Examiner—Robert Beausoliel
Assistant Examiner—Charles Ehne
(74) Attorney, Agent, or Firm—Alston & Bird LLP

(57) ABSTRACT

Disclosed is a method for implementing data backup and recovery in a computer hard disk. The method includes the following steps. First, a computer motherboard is powered up and BIOS is booted through triggering of hardware. At the same time, information about a computer bootstrap mode is stored in a recording device, the information representing a mode to start a conventional operating system or a mode to start a backup/recovery function. Then BIOS reads the information about the computer bootstrap mode from the recording device and determines which mode it represents. If the information represents a mode to start a conventional operating system, the computer is booted with a preinstalled conventional operating system. If the information represents a mode to start a backup/recovery function, BIOS operates the protection partition of a hard disk, loads the kernel of an inserted operating system and performs the backup/recovery processing. According to the invention, the data backup/recovery function can be started directly through triggering hardware, and the loaded inserted operating system can be dynamically updated, so it is more convenient and flexible in application.

10 Claims, 3 Drawing Sheets

METHOD FOR IMPLEMENTING DATA BACKUP AND RECOVERY IN COMPUTER HARD DISK

FIELD OF THE TECHNOLOGY

The invention relates generally to data security techniques for a computer hard disk, and more particularly to a method for implementing data backup and recovery in a computer hard disk.

BACKGROUND OF THE INVENTION

As computers have increased in popularity, the number of computer viruses has increased. Accordingly the security requirements for computer data are also increasing. Since the hard disk is a main device for storing computer data, security of its data is a serious concern.

Except for computer viruses, many other factors, such as a user operation error, a hacker attack, etc. can possibly harm the data security of a hard disk. All of these can immediately destroy data that has been created by users with hard work, and furthermore, it is possible to crash the whole computer system and lose all stored data. This can result in great loss for the user.

In order to maximize protection of the hard disk data, data backup and recovery technology for hard disk has been created. With this technology, the important data in a hard disk can be safely copied to a protection area and the data can be recovered when destroyed. Users need not worry about data security again to a certain degree.

At present, there are several methods for data backup and recovery in a hard disk. In one method, data backup and recovery is accomplished through a backup hard disk. In this method, except for the working hard disk for storing the operating system and user data to be used, another hard disk, known as backup hard disk, for backing up data in the working hard disk is needed. With this method, all user data can be backed up completely and this method hence has a high reliability. Nevertheless, adding an independent backup hard disk increases the cost of the computer, and at the same time, the setting of basic input output system (BIOS) should be changed. Accordingly, this is not a useful method for a common user.

In a second method, data backup and recovery is accomplished with an optical disk or a floppy disk. In this method, when a computer is dispatched from the vendor, a recovery disk made by an optical disk or a floppy disk is provided. The recovery disk records the operating system and a portion or all of application software that has been installed in the computer delivered from the vendor. When the computer system crashes, the user can recover the computer to the original state when it is delivered from the vendor with this recovery disk. This method is easy to use but has two disadvantages. Firstly, the computer can only be recovered to the state it was in when it was delivered from the vendor, and thus this method is unable to provide a real-time backup and recovery. Secondly, the user must reserve the recovery disk carefully, so this method has much limitation in use.

In a third method, data backup and recovery is accomplished through a hard disk partition. At present, there is some hard disk partition software available, such as GHOST, etc. With the hard disk partition software, a hard disk can be separated into several logically independent partitions and one of which, referred to as the backup partition, can be used to store the backup data. When data in other partitions is destroyed, the data can be recovered with the backup data in the backup partition. Although this is a good technique, destruction of data by virus and some operation errors cannot be fully avoided since the backup partition and other partitions are located in the same hard disk.

In a fourth method, data backup and recovery is based on BIOS. Chinese application number 01134778.3, by the same applicants and titled "Method for Data Backup and Recovery of Hard Disk," provides a method for data backup and recovery based on BIOS. In this method, the program for implementing data backup and recovery is set in the BIOS chip and cannot be modified. During BIOS booting, a user can press the hot key of backup to enter the backup menu, or the hot key of recovery to enter the recovery menu. This method is reliable and secure, but it has two shortcomings. Firstly, the operation is inconvenient because a pressed hot key can be responsive only during the short BIOS boot period. If the BIOS boot period is over, the computer must be rebooted for data backup and recovery. Secondly, since the program for implementing data backup and recovery set in the BIOS chip cannot be modified, the BIOS chip must be replaced when the software needs updating. So it is inconvenient for users to update or modify the software.

As mentioned above, though several methods for data backup and recovery have been provided and put to use, each of them has various disadvantages respectively. The fourth method has the highest security and reliability among the above-mentioned methods, but ease of use is poor. The present invention provides a more convenient method for data backup and recovery.

SUMMARY OF THE INVENTION

It is an object of the present invention to provide a more convenient method for implementing data backup and recovery in a computer hard disk based on BIOS.

In order to achieve the above object, one aspect of the present invention is a method for implementing data backup and recovery in a hard disk, the method at least including the following steps:

a. A computer motherboard is powered up and BIOS booted by triggering hardware. Information about the computer bootstrap mode is stored in a recording device. The information has at least two kinds: one representing to start a conventional operating system and the other representing to start a backup/recovery function; and b. the BIOS reads the information about computer bootstrap mode from the recording device and determines which mode it represents. If the information represents a mode to start a conventional operating system, Step c is executed. If the information represents a mode to start a backup/recovery function, Step d is executed.

In step c, the computer is booted with a preinstalled conventional operating system.

In step d, the BIOS operates the protection partition of hard disk, loads the kernel of an inserted operating system and performs the backup/recovery function processing.

In the method mentioned above, a backup/recovery function key can be set on the hardware, and the information about computer bootstrap mode recorded in the recording device can be set to represent to start a backup/recovery function when the backup/recovery function key is pressed and set to represent to start a conventional operating system otherwise. Further, the hardware can be a computer keyboard, and the recording device can be a function register in the computer keyboard.

In the method mentioned above, the protection partition mentioned in Step d can be a storing area for storing backup data and it can be partitioned at the upper end of the computer hard disk according to the ATA-5 standard. At the same time, the capacity of the storing area can be adjusted according to the size of the backup data.

In the method mentioned above, the recovery processing in Step d can comprise the following steps:

d11. determining which recovery mode the command inputted from a recovery menu means to use; if the mode is recovering the hard disk to a state dispatched from the vendor, then executing Step d12; if the mode is recovering the operating system in a logical partition, then executing Step d13; and if the mode is recovering user data, then executing Step d14;

d12. recovering the hard disk to the state dispatched from the vendor, then executing Step d15;

d13. further determining whether the hard disk to be recovered is normal, if so, recovering the operating system in the logic partition of hard disk, otherwise executing Step d15;

d14. further determining whether the hard disk to be recovered is normal, if so, recovering user data, otherwise executing Step d15;

d15. returning to the recovery menu.

In the method mentioned above, the backup processing in Step d can comprise the following steps:

d21. determining which backup mode the command inputted from the backup menu means to use; if the mode is backing up operating system in a logical partition, then executing Step d22; if the mode is backing up user data, then executing Step d23;

d22. backing up the operating system in the logical partition, then executing Step d24;

d23. backing up the user data, then executing Step d24;

d24. returning to the backup menu.

In the method mentioned above, the logical partition where the operating system is installed can be disk C. The method can further comprise a password authorization step before the backup menu or recovery menu is opened.

In the method mentioned above, backing up means to copy the operating system or user data to the protection partition, and record their original address at the hard disk. In addition, recovering means to copy backup files of the operating system and user data in protection partition of hard disk to an appropriate address pointed by the original address of the operating system or user data.

It can be seen that the backup and recovery function can be started directly by triggering hardware when the computer is in a shutdown state according to the invention. Accordingly, the invention is more convenient as compared to the situation requiring pressing a key during the BIOS bootstrap process to start the backup and recovery function. Simultaneously, the backup and recovery function is done by loading the kernel of an inserted operating system in the present invention, which is more flexible as compared to the situation where the program codes of the backup and recovery function are fixedly set in the BIOS chip.

In addition, the backup and recovery function of the invention can be started directly without going through the conventional operating system. This avoids a situation in which the backup and recovery function cannot be used when the conventional operating system is destroyed. Additionally, the invention does not occupy software/hardware resources. Therefore, there is no conflict with the hardware, such as the hard disk protection card, and it hence has good compatibility with hardware.

EMBODIMENTS OF THE INVENTION

The invention will be described in more detail hereinafter, with reference to the accompanying drawings and an embodiment.

In this embodiment, a backup/recovery function key is set on the keyboard at first. When system backup/recovery is needed, the user can press the key when the computer is in shutdown or rebooting state, and at this time a corresponding content value will be set in the function register of the keyboard and the motherboard will be powered up. During startup, the BIOS reads the content value from the keyboard function register. If the content value shows that system backup/recovery is needed, the BIOS operates ATA-5 (Advanced Technology Attachment) protection partition and loads the kernel of an inserted operating system, and then starts the backup/recovery function.

Figure 1:
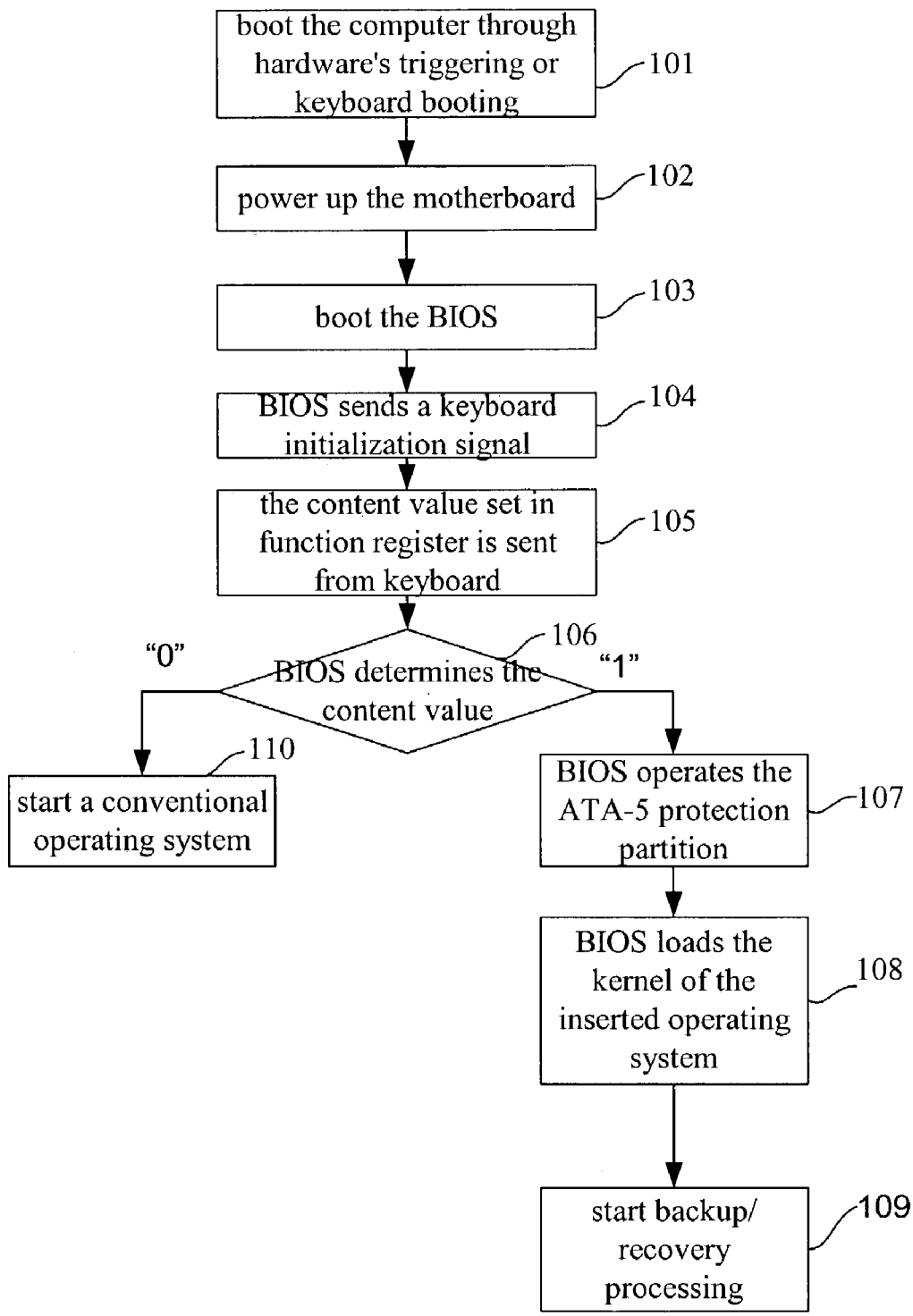
FIG. 1 illustrates a general flowchart of the invention.

FIG. 1 is a general flowchart of the invention. Referring to FIG. 1, at Step 101, the computer is booted through pressing the backup/recovery function key, or through a conventional bootstrap method, such as pressing a power on key on the motherboard or a remote controller, etc. At Steps 102 and 103, the motherboard is powered up, the BIOS is booted and the computer hardware including the keyboard is initialized. At Step 104, the BIOS sends an initialization signal to the keyboard. At Step 105, the keyboard not only responds to the normal requirements of the BIOS, but also sends the content value from the function register to the BIOS.

Here, the function register is located in the keyboard and used for storing information about the computer bootstrap mode. This means that the stored information is used to differentiate whether to start a conventional operating system or a backup/recovery function when the computer is booted. In this embodiment, the content value represents to start a conventional operating system bootstrap if it is "0" as the default value, and to start a backup/recovery function if it is "1". The content value in the function register will be set to "1" if the backup/recovery function key is pressed to boot the computer, and "0" otherwise.

Figure 2:
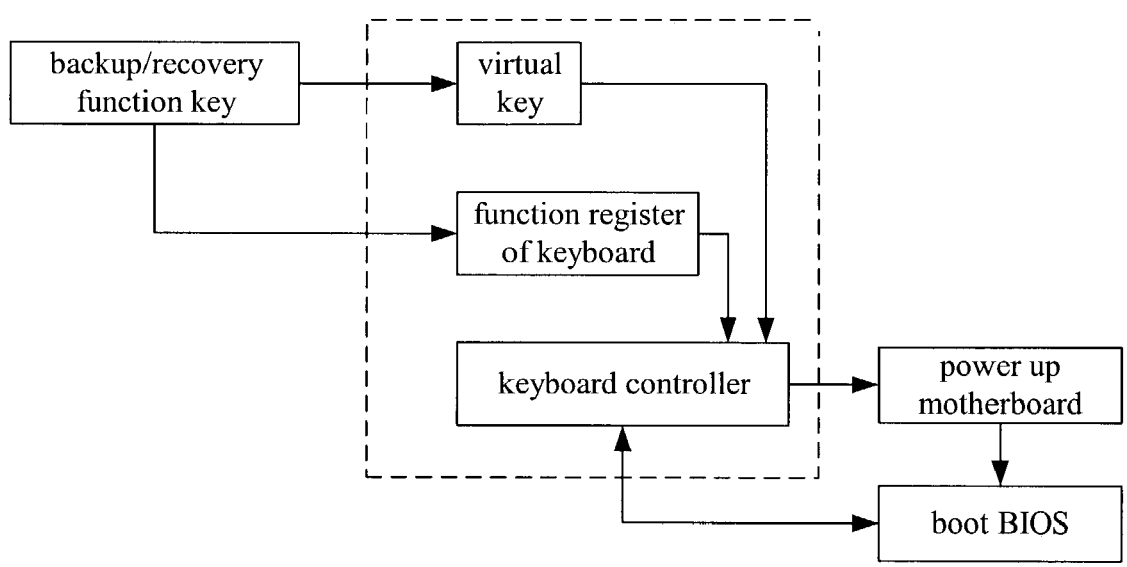
FIG. 2 schematically illustrates the setting and conveying principle of the content value set in the function register.

FIG. 2 schematically illustrates the setting and conveying principle of the content value set in the function register. In this embodiment, the well-known keyboard boot technique and virtual key technique are used. That is, an independent backup/recovery key is set on the keyboard, and when the backup/recovery key is pressed, the virtual key and the function register in the keyboard are triggered simultaneously. Here, the virtual key is a real key hidden inside the keyboard, and is used to convey the bootstrap key codes to the keyboard controller. Then, the keyboard controller controls the powering up of the motherboard and the booting of the BIOS. When the function register is triggered through the backup/recovery key, the content value is set to "1" and then conveyed to the keyboard controller. When the BIOS is booted, it conveys an initialization signal to the keyboard controller. In response to the initialization signal, the keyboard controller conveys the content value to the BIOS.

After the BIOS has received the content value from the function register, a determination is made at Step 106 to see whether the content value is "0" or "1". If it is "0", Step 110 is executed, i.e., a conventional operating system other than backup/recovery function is started. If it is "1" which means a backup/recovery operation is to be started, Step 107 is executed.

In Step 107, the BIOS operates the ATA-5 protection partition. Here, the commonly known ATA-5 standard and its Host Protected Area function are used. That is, a portion of an upper end of the hard disk is partitioned as a protected area for storing backup data. In this way, the data security is guaranteed at the hardware level. In the protected area, the codes of the backup/recovery function and the information about the original state of the hard disk are stored when the computer is dispatched from the vendor. The size of the protected area can be controlled by program, the user authorization to the area is effectively protected, and unload function is also provided.

At Step 108, the BIOS loads the kernel of the inserted operating system that is an operation platform based on BIOS. The backup/recovery function of the invention is implemented on this platform. Here, the inserted operating system is a single function operating system that is independent of the conventional operating system and installed in the ATA-5 hidden area of the hard disk. When BIOS determines to boot the inserted operating system, it directly reads the kernel of the inserted operating system from the ATA-5 hidden area and loads it to the memory of the computer. Prearranged processing, such as backup/recovery processing, can be done based on the inserted operating system afterwards. There is no need to run the conventional operating system while the inserted operating system is running, so this method is faster and more secure for running some specific application programs.

After the kernel of the inserted operating system has been loaded by the BIOS, the backup/recovery function can be started at Step 109; the user can select backup function or recovery function, which will be described in more detail with reference to FIG. 3.

Figure 3:
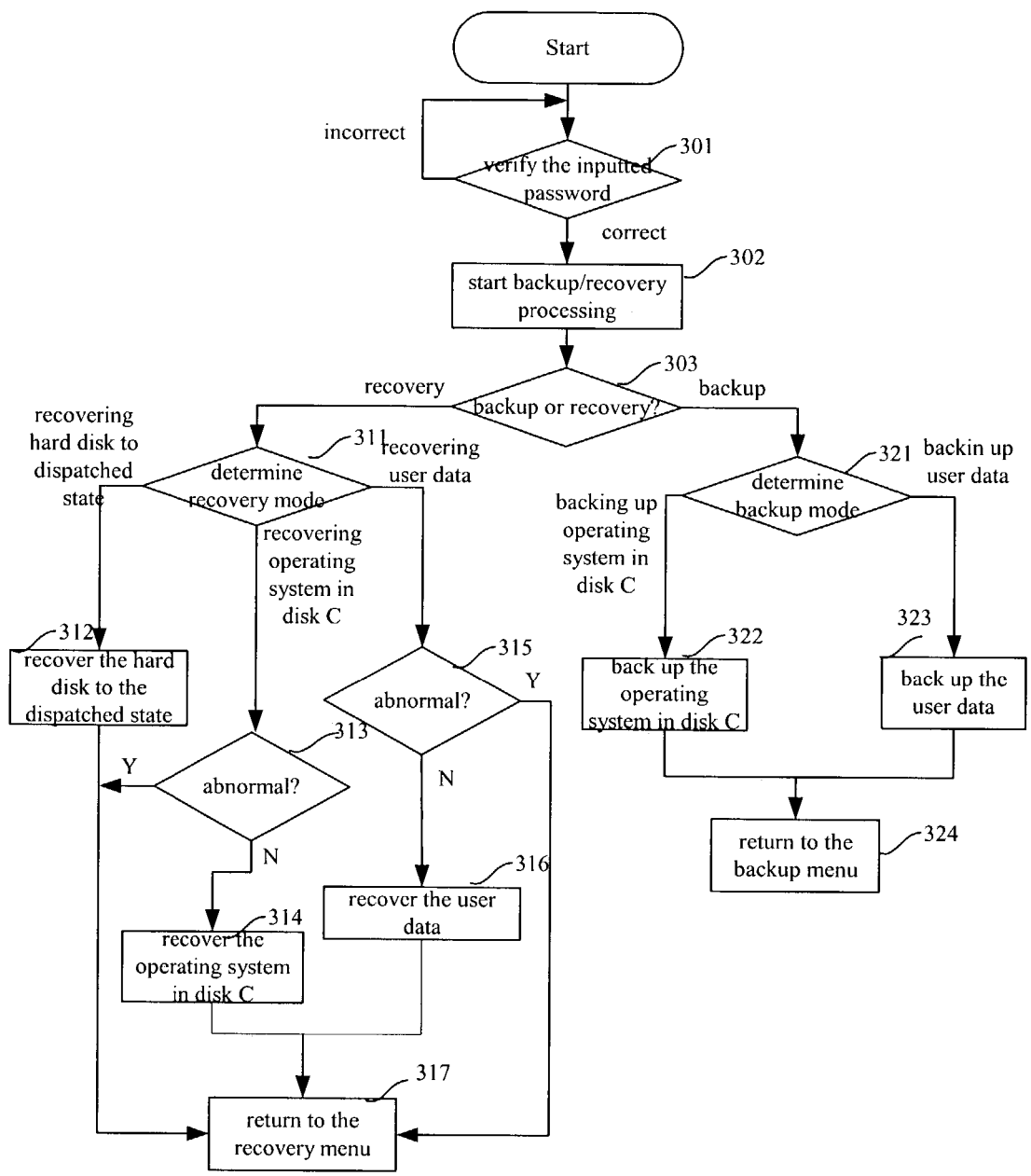
FIG. 3 illustrates a flowchart of a specific backup and recovery processing.

As shown in FIG. 3, while the backup/recovery function is started after the kernel of the inserted operating system has been loaded, a user password is asked firstly at Step 301, and the inserted operating system will check whether the inputted password is correct. If the inputted password is incorrect, the user will be asked to input password again. If the inputted password is correct, the backup/recovery program is started at Step 302. At Step 303, the user selects the backup function or the recovery function. If the backup function is selected, Step 321 and its successive steps will be executed then. If the recovery function is selected, Step 311 and its successive steps will be executed then.

Recovering means to copy the operating system or the user data stored in the protection partition of hard disk to an appropriate address in hard disk according to the recorded original address information. In this embodiment, there are three recovery modes: recovering hard disk to dispatched state, i.e., recovering all content of the hard disk to the state while the computer was delivered from the vendor; recovering operating system in logic partition, i.e., recovering the operating system in the original logic partition of the hard disk; recovering user data, i.e., copying user data to an idle area in a logic partition of the hard disk. The complete procedure of recovering can be referenced to a commonly known technique and there is no limitation in the invention.

At Step 311, which recovery mode is selected from the recovery menu by user is determined. If the user selects to recover the hard disk to the dispatched state, the hard disk is recovered at Step 312 and then the system executes Step 317, i.e. returns to the recovery menu. If the user selects to recover the operating system in disk C, then whether an abnormal state, such as not enough space in hard disk, exists is further checked at Step 313. If there is an abnormal state, the system executes Step 317; otherwise, the operating system is recovered at Step 314, then the system executes Step 317. If the user selects to recover the user data, whether an abnormal state, such as no enough space in hard disk, exists is further checked at Step 315. If there is an abnormal state, the system executes Step 317; otherwise, the user's backup data are recovered at Step 314, then the system executes Step 317.

Backing up means to copy the operating system or user data to the protection partition, and record the original hard disk addresses of them. Similar to the recovery, there are two backup modes in this embodiment: and backing up logical partitions, i.e., all content of a logical partition is backed up; backing up user data, i.e., the important user data are backed up. A user can determine what user data is needed for backing up by searching the hard disk space. Then, the user data to be backed up are compressed and copied to the ATA-5 protection partition. A user can manage the backup data through the operation interface, and the backup data can be backed up again through accumulation mode. In this embodiment, the system will execute different backup steps in response to each of the backup modes. A commonly known technique can be applied in the specific backup operation and the invention has no special limitation in this respect.

At Step 321, which backup mode is selected through the backup menu by user is determined. If the user selects to back up the operating system in disk C, the system executes Step 322 for backing up the operating system at first, then executes Step 324, i.e., returns to the backup menu. If the user selects to back up the user data, the system executes Step 323 for backing up the user data, then executes Step 324.

The above description only illustrates one embodiment of the present invention. In fact, the operating system to be backed up and recovered is not limited to be in disk C. For example, when there are dual operating systems, if required, the user can back up or recover the operating system in other disks, such as disk D, with the same method for disk C. Besides, in the embodiment, a real backup/recovery function key is set on the keyboard, but the combination of keys on the keyboard can function as the backup/recovery function key. At the same time, the virtual key can be a software analog key that interacts with the keyboard controller to implement keyboard bootstrap. The backup/recovery function key can also be set on a motherboard or a remote controller, and the function register can be substituted by a corresponding MCU. So, it is to be understood that the embodiment only shows the spirit of the invention and it is by no means to limit the scope of protection available to applicants.

That which is claimed is:

1. A method for implementing data backup and recovery in a hard disk of a computer, comprising:
   a. pre-setting a backup/recovery function key and a recording device on the hardware, wherein the recording device is for recording the information about the computer bootstrap mode;
   b. powering a computer motherboard and booting a computer BIOS by triggering hardware, and if by pressing on the backup/recovery function key, storing information about starting a backup/recovery function in the recording device;
   c. reading the information about the computer bootstrap mode from the recording device, if the information represents a backup/recovery function to be started, proceeding to step d, otherwise, proceeding to step e; and
   d. operating the hard disk protection partition by BIOS, loading a kernel of an embedded operating system and performing the backup/recovery processing; or
   e. booting the computer with a preinstalled conventional operating system.

2. The method according to claim 1, wherein the hardware is a computer keyboard, and the recording device is a function register in the computer keyboard.

3. The method according to claim 1, wherein the protection partition is a storing area for storing backup data partitioned at the upper end of the computer hard disk according to the ATA-5 standard; and the capacity of the storing area can be adjusted according to the size of the backup data.

4. The method according to claim 1, wherein the recovery processing step of Step d comprises the steps of:
- d11. opening a recovery menu and determining a command inputted from the recovery menu, wherein if the command is to recover the hard disk to a state dispatched from the vendor, then executing Step d12; or if the command is to recover the operating system in a logical partition, then executing Step d13; or if the command is to recover user data, then executing Step d14;
- d12. recovering the hard disk to the state dispatched from the vendor, and then executing Step d15; or
- d13. further determining whether the hard disk to be recovered is normal, and if yes, then recovering the operating system in the logic partition of hard disk, otherwise executing Step d15; or
- d14. further determining whether the hard disk to be recovered is normal, and if yes, recovering user data, otherwise executing Step d15; and
- d15. returning to the recovery menu.

5. The method according to claim 1, wherein the backup processing step of Step d comprises the steps of:
- d21. opening a backup menu and determining a command inputted from the backup menu, wherein if the command is to back up the operating system in a logical partition, then executing Step d22; or if the command is to back up user data, then executing Step d23;
- d22. backing up the operating system in the logical partition, and then executing Step d24; or
- d23. backing up user data, and then executing Step d24; and
- d24. returning to the backup menu.

6. The method according to claim 4, wherein the logical partition where the operating system is installed is disk C.

7. The method according to claim 5, wherein the logical partition where the operating system is installed is disk C.

8. The method according to claim 4, further comprising authorizing a user password before the recovery menu is opened.

9. The method according to claim 5, further comprising authorizing a user password before the backup menu is opened.

10. The method according to claim 1, wherein the backup processing comprises copying the operating system in a logical partition or user data to the protection partition, and recording the original address of the operating system or user data at the hard disk, and wherein the recovery processing comprises copying backup files of the operating system or user data in the protection partition of a hard disk to an address indicated by the original address of the operating system or user data.

* * * * *